United States Patent
Ladhari et al.

(10) Patent No.: US 9,783,077 B2
(45) Date of Patent: Oct. 10, 2017

(54) SYSTEM COMPRISING A BATTERY FORMED BY BATTERY MODULES, AND CORRESPONDING METHOD FOR CONNECTING OR DISCONNECTING A BATTERY MODULE

(71) Applicant: RENAULT S.A.S., Boulogne-Billancourt (FR)

(72) Inventors: Othman Ladhari, Grenoble (FR); Remy Thomas, Grenoble (FR); Pierre Perichon, Voiron (FR); Anh Linh Bui Van, Saint Nizier du Moucherotte (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/758,827

(22) PCT Filed: Dec. 17, 2013

(86) PCT No.: PCT/EP2013/076975
§ 371 (c)(1),
(2) Date: Jul. 1, 2015

(87) PCT Pub. No.: WO2014/106576
PCT Pub. Date: Jul. 10, 2014

(65) Prior Publication Data
US 2015/0336469 A1    Nov. 26, 2015

(30) Foreign Application Priority Data
Jan. 2, 2013    (FR) ...................................... 13 50011

(51) Int. Cl.
H01M 10/44    (2006.01)
H01M 10/46    (2006.01)
(Continued)

(52) U.S. Cl.
CPC ......... B60L 11/1864 (2013.01); H02J 7/1423 (2013.01); H02M 1/36 (2013.01);
(Continued)

(58) Field of Classification Search
CPC ...... H02J 7/0008; H02J 7/0009; H02J 7/0013; H02J 7/1423
(Continued)

(56) References Cited

U.S. PATENT DOCUMENTS 8,310,204 B2    11/2012    Lee et al.
2002/0101217 A1    8/2002    Hosoda et al.
(Continued)

OTHER PUBLICATIONS

International Search Report issued Apr. 4, 2014, in PCT/EP2013/076975, filed Dec. 17, 2013.

*Primary Examiner* — Edward Tso
(74) *Attorney, Agent, or Firm* — Oblon, McClelland, Maier & Neustadt, L.L.P.

(57) ABSTRACT

A system and corresponding method, including a battery including a plurality of battery modules arranged in series, each module including a switch and a diode arranged in series and connected in parallel to the module. The system further includes a capacitor connected directly by an electrical connection to a point situated between the diode and the switch of each module, and directly to the negative terminal of the battery, and a load connected in parallel to the capacitor, a mechanism controlling each module switch using a pulse width modulation signal having a duty cycle that varies between 0% and 100%.

16 Claims, 5 Drawing Sheets (51) Int. Cl.
*B60L 11/18* (2006.01)
*H02J 7/14* (2006.01)
*H02M 1/36* (2007.01)
*H02M 3/156* (2006.01)
*H02M 3/158* (2006.01)
*H02J 7/34* (2006.01)

(52) U.S. Cl.
CPC ............ *H02M 3/156* (2013.01); *H02M 3/158* (2013.01); *B60L 2210/12* (2013.01); *B60L 2210/14* (2013.01); *B60L 2260/26* (2013.01); *H02J 7/345* (2013.01); *H02M 3/1588* (2013.01); *Y02T 10/7005* (2013.01); *Y02T 10/7022* (2013.01); *Y02T 10/7061* (2013.01); *Y02T 10/7225* (2013.01); *Y02T 10/7233* (2013.01)

(58) Field of Classification Search
USPC ..................... 320/107, 116, 118, 119, 141
See application file for complete search history.

(56) References Cited

U.S. PATENT DOCUMENTS

| | | | |
|---|---|---|---|
| 2011/0140662 A1* | 6/2011 | Li | H02J 7/0016 320/116 |
| 2011/0298427 A1 | 12/2011 | Uemura et al. | |
| 2011/0309795 A1* | 12/2011 | Firehammer | H02J 7/0014 320/118 |
| 2011/0316489 A1 | 12/2011 | Norimatsu et al. | |
| 2012/0043818 A1* | 2/2012 | Stratakos | H02J 3/383 307/77 |
| 2015/0340947 A1* | 11/2015 | Deboy | H02J 3/385 307/82 |

\* cited by examiner

SYSTEM COMPRISING A BATTERY FORMED BY BATTERY MODULES, AND CORRESPONDING METHOD FOR CONNECTING OR DISCONNECTING A BATTERY MODULE

BACKGROUND

The invention relates to systems that are provided with batteries formed by battery modules arranged in series, and particularly to electric or hybrid powertrain automobiles.

These systems can comprise a load to be supplied with power, for example, in the case of a vehicle, an electric powertrain supplied with electricity by a battery. This battery is generally composed of a plurality of battery modules arranged in series, and the modules can be independently series connected or not, which corresponds to an activation or a deactivation. In other words, the number of battery modules activated varies depending on the voltage that one wishes to supply to the load.

A capacitor is arranged between the battery and the load so as to smooth out the high frequency currents but also the transient currents absorbed by a converter stage which can be an inverter arranged at the input of the powertrain. When the battery (that is to say the group of modules) is connected by relay to the powertrain, for example, during starting of the vehicle, high transient currents appear and can damage the components, for example, the capacitor, the relays used or the power switches.

Furthermore, a rapid voltage variation at the terminals of the inverter stage arranged at the input of the powertrain cannot be brought under control fast enough by the inverter stage, which can generate jolts that are felt by the driver of the rolling vehicle. These jolts can damage the mechanical elements of the powertrain.

In vehicles, pre-charging the capacitor just during starting of the vehicle has been proposed, using a circuit comprising two contactors and a resistor in series with the capacitor. A first contactor makes it possible to charge the capacitor through the resistor with a reduced current, and a second contactor makes it possible to by-pass the resistor for normal operation. This solution has the disadvantage of requiring a circuit comprising expensive and cumbersome contactors, and the contactors run the risk of remaining closed if they are exposed to excessively high currents.

One can refer to the European patent application EP 2 361 799 which describes a system for increasing the voltage at the terminals of the capacitor before connecting the powertrain, that is to say a system for pre-charging the capacitor. In particular, this document proposes using a resistor in order to form a R-C type circuit for charging the capacitor. This system has the disadvantage of not enabling one to obtain complete charging of the capacitor, the charging time taking too long. This system also has the disadvantage of adding a resistor in series to the system. This system therefore cannot be used during starting of the vehicle because of this resistor. It is therefore not suitable for activation or deactivation of a battery module during the operation of the vehicle.

One can also refer to the American patent application US 2012/0025768 which describes a system for pre-charging a capacitor having a low-value resistor, and a switch unit for improving the pre-charging of the capacitor. This system cannot be used during operation of the vehicle either.

The international patent application WO 2009/077668 describes a system for pre-charging a capacitor in which a switch is connected in series to the capacitor, and this switch is controlled with a pulse width modulation signal whose duty cycle varies. This solution has the disadvantage of increasing the impedance of the branch containing the capacitor.

Finally, one can refer to the French patent application FR 2 923 962 which describes another system for pre-charging a capacitor using a "boost" type power converter but which also has the disadvantage of increasing the impendence of the branch containing the capacitor. It is consequently impossible to use this system during operation of the vehicle because of the excessive losses due to the increase of the impedance.

SUMMARY

An aim of the present invention is to allow the activation or deactivation of a battery module at any time, for example, in the case of an automobile, during starting and during operation of a vehicle.

The present invention also aims to improve the pre-charging of a capacitor by reducing the generation of currents capable of damaging the components.

According to one aspect, a system is proposed, which comprises a battery formed by a plurality of battery modules arranged in series, each module being provided with a switch and a diode arranged in series and connected in parallel to the module, the system moreover comprising a capacitor connected, on one hand, directly by an electrical connection to a point situated between the diode and the switch of each module, and, on the other hand, directly to the negative terminal of the battery, and a load connected in parallel to the capacitor.

In other words, for each battery module, a half-H bridge is connected in parallel to the module, the branch of the middle corresponding to said point between the diode and the switch.

According to a general characteristic, the system comprises means for controlling each module switch using a pulse width modulation signal having a duty cycle that varies between 0% and 100%.

Preferably, the system comprises means for controlling each module switch using a pulse width modulation signal having a duty cycle that varies between 0% and 100%, 0% and 100% being excluded, or between 5% and 95%. One thus obtains a better control of the switches, excessively short pulses being capable of not allowing suitable control of the switches.

It is thus possible to use switches capable of switching more or less rapidly. However, it is appropriate to note that switches capable of switching rapidly can be used in order to extend the interval in which the duty cycle varies, for example, switches using gallium nitride (GaN).

The group formed by the switch, the diode, the electrical connection, which has an intrinsic inductance called wiring inductance, and the load forms a circuit well known to the person skilled in the art as "buck" circuit. In this case, the capacitor is alone in its branch on which the load is connected; there are therefore no losses due to an impedance increase. A battery module can therefore be connected or disconnected at any time.

Furthermore, the system makes it possible to charge the capacitor more rapidly and to control the charging time in order to prevent high transient currents.

It can be noted that one goes from a duty cycle of 0% (switch open) to a duty cycle of 100% (switch closed), for example, in case of connection of an additional module: the voltage of the module to be connected will be added to the voltage of the already connected modules once the duty cycle has varied up to 100%.

One goes from a duty cycle of 100% to a duty cycle of 0% in the case of disconnection of a module: the voltage of the module to be disconnected will be subtracted when the duty cycle varies down to 0%. Of course, means can be provided for ensuring a disconnection of a module in the group of modules in series without preventing the functioning of the group, for example, diodes in parallel of the switches or intrinsic diodes of switches.

The means for controlling each module switch can vary the duty cycle of the pulse width modulation signal by the same percentage in each pulse, for example, 1% in each pulse.

Furthermore, the control means can vary the frequency of the pulse width modulation signal, for example, as a function of the duty cycle.

In can be particularly advantageous to vary this frequency in order to reduce the duration of the periods corresponding to certain duty cycles. In particular, the duty cycles in the vicinity of 50% correspond here to the maximum current variations, and it is therefore preferable to reduce their duration, that is to say to increase the switching frequency.

The system can moreover comprise, for each module, an additional capacitor connected in parallel to the diode and to the switch of the module.

Each additional capacitor can supply transient currents which are added to those supplied by the main capacitor connected in parallel to the load, which reduces the power losses generated by the switching of the switches and which also allows one to use a capacitor having a lower capacitance value.

For each module, the switch can be a MOSFET transistor, and the diode is an intrinsic diode of a MOSFET transistor. In other words, two MOSFET transistors are arranged in series, and the capacitor is connected between these two MOSFETs. As for the diode, it is obtained by blocking one of the two MOSFET transistors, for example, that which is connected to the negative terminal of the battery module.

The system can comprise additional means for controlling the MOSFET transistor corresponding to the diode of each module using the inverse signal of that which controls each switch. Of course, it is also possible to take into consideration a lag time, for example, a dead time, in order to prevent short circuits of the battery during switching.

It is also possible to run a current through the transistor corresponding to said diode when the switch is open, and to allow the flow of a current of negative sign (the diode normally preventing this direction of flow). One thus prevents the appearance of discontinuities in the flow of the current.

The system can have means for adjusting the inductance of each electrical connection, for example, an additional electrical connection portion or ferrite elements for adjusting this inductance.

Proposed according to another aspect is an electric or hybrid powertrain automobile comprising said system, said load being the powertrain of the vehicle.

The invention makes it possible to obtain a reduction of the jolts felt by the driver during rolling.

Proposed according to another aspect is a method for adapting the voltage at the terminals of an input capacitor of a load of a system provided with a battery formed by a plurality of battery modules each provided with a switch, said method comprising connection and/or disconnection of a battery module to the capacitor.

According to a general characteristic, the method comprises elaboration of a pulse width modulation signal having a duty cycle varying between 0% and 100% in order to control the switch of said battery module.

The duty cycle of the pulse width modulation signal can be varied by the same percentage in each pulse.

The frequency of the pulse width modulation signal can be varied.

The method can comprise an adjustment of the inductance of the electrical connection connecting the capacitor and the battery module.

The duty cycle can be varied between 0% and 100%, 0% and 100% being excluded, or between 5% and 95%.

BRIEF DESCRIPTION OF THE DRAWINGS

Other aims, characteristics and advantages will appear upon reading of the following description given only as a non-limiting example in reference to the appended drawings in which.

DETAILED DESCRIPTION

Figure 1:
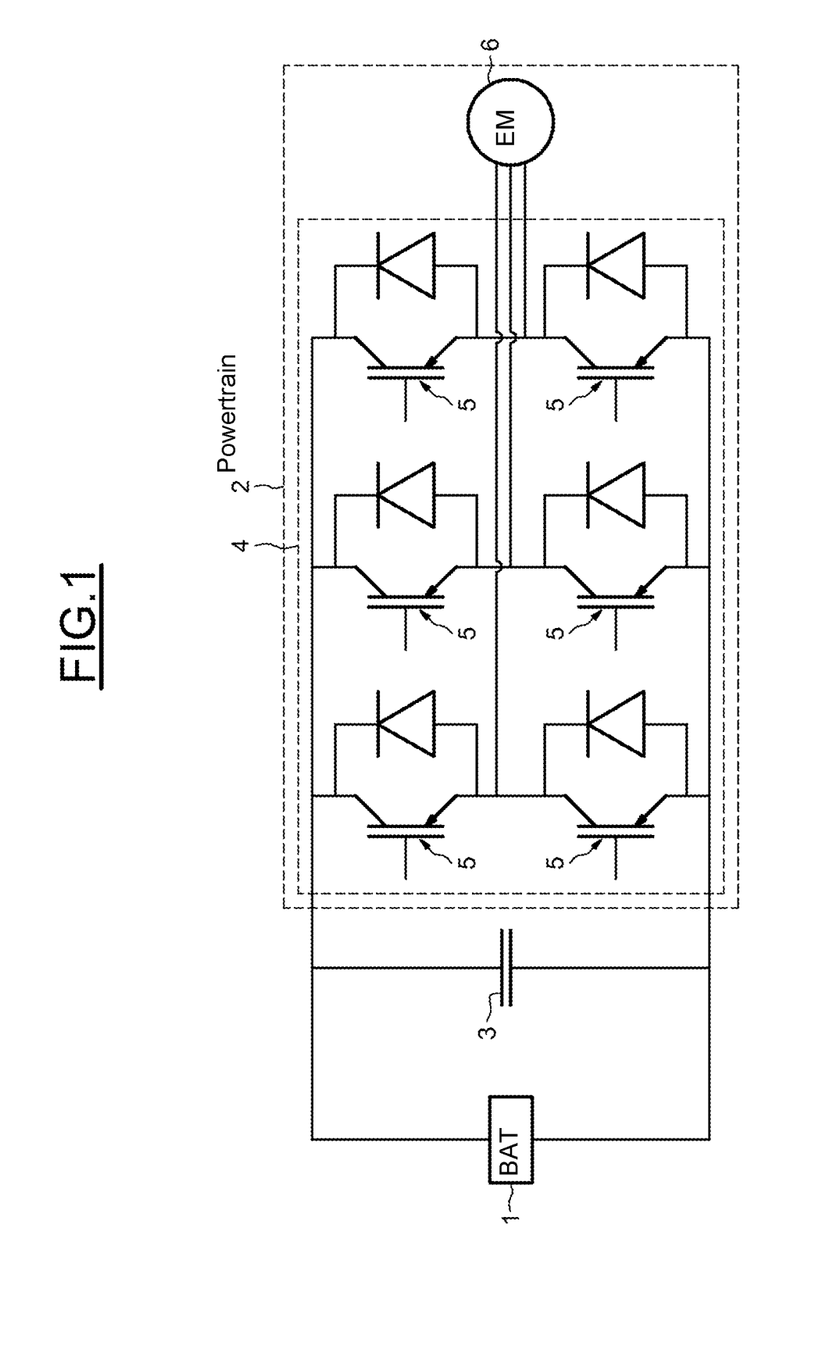
FIG. 1 diagrammatically illustrates a battery connected to a powertrain.

Represented in FIG. 1 is a battery 1, for example, a battery of an electric or hybrid powertrain automobile, formed by a plurality of battery modules in series. The battery 1 is connected to a powertrain 2 through a capacitor 3. It is the capacitor 3 that is advisably pre-charged in order to protect it as well as the other components, for example, during starting of the vehicle (connection of the battery 1) or during connection of a battery module.

The powertrain 2 in a conventional manner comprises an inverter stage 4 comprising a plurality of switches 5 intended for controlling an electric machine 6, which has mechanical parts that can be damaged with the appearance of excessively high currents during connection of the battery or of a battery module.

Figure 2:
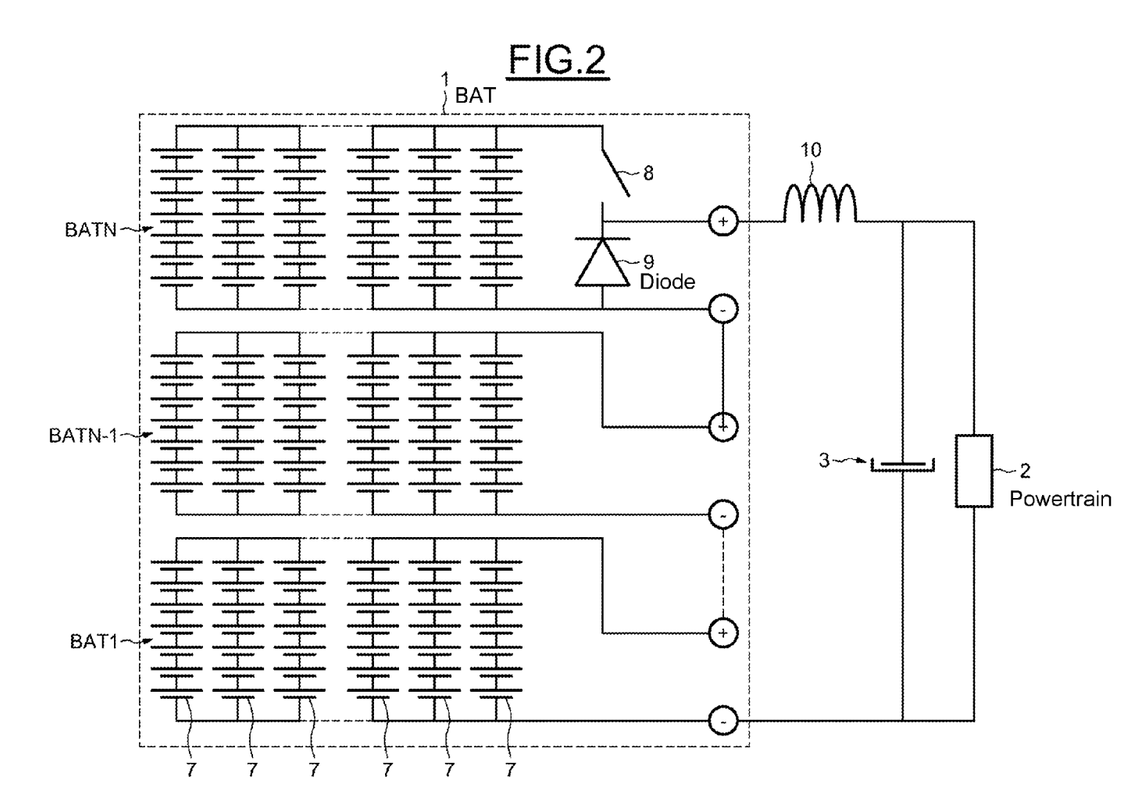
FIGS. 2 to 4 diagrammatically illustrate electrical circuits of embodiments and methods of implementation according to the invention.

Represented in greater detail in FIG. 2 is the battery 1 which has a plurality of battery modules referenced BAT1 to BATN. Three battery modules are represented here, BAT1, BATN−1 and BATN. Each module has a plurality of battery cells 7 arranged both in series and in parallel. For reasons of simplicity, all the cells 7 have not been referenced in FIG. 2.

The cell module BATN has been represented with a switch 8 and a diode 9 arranged in series between the + and − terminals of the battery module BATN. An electrical connection, represented by its intrinsic inductance 10, is connected, on one hand, to a point situated between the switch 8 and the diode 9, and on the other hand, to the capacitor 3, to which the powertrain 2 is connected, represented here by a load.

It is noted that the branch containing the capacitor 3 does not contain the switch, whereas such is the case in certain known solutions of prior art. There is consequently no increase of impedance of a power circuit that can generate losses.

Of course, the other battery modules BAT1 to BATN−1 can also comprise switches 8 and diodes 9, as well as a connection to the capacitor which can be left open, for example, once the connection of the module is complete. It can also be noted that the switch 8 of each already connected module is in closed position: the duty cycle of the control is 100% for these switches.

Figure 3:
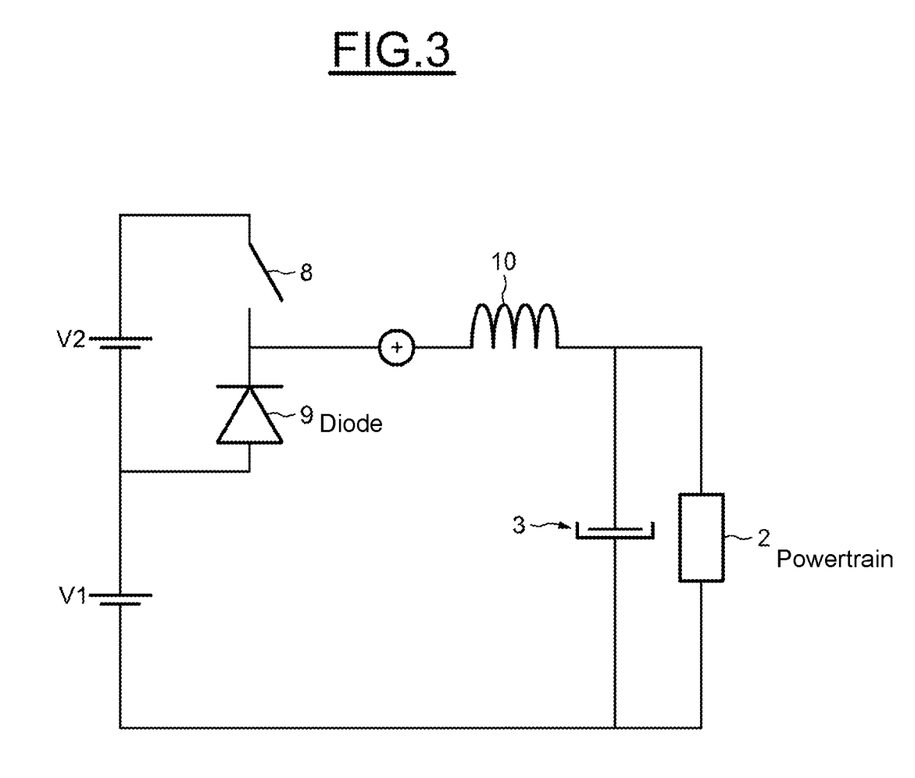

The circuit of FIG. 2 can be represented in a simplified manner as illustrated in FIG. 3. One recognizes a "Buck" converter type circuit which is well known to the person skilled in the art.

The voltage at the terminals of the module BATN is represented by a voltage source referenced V2, and the voltage at the terminals of the group of modules BAT1 to BATN−1 is represented by a voltage source referenced V1.

In the case of connection of the module BATN, one wishes to obtain a voltage at the terminals of the capacitor and therefore of the powertrain 2 equal to the sum of the voltages V1 and V2.

It is possible to calculate the variation of the value of the current passing through the inductance 10 when the switch 8 is closed and when it is open. These two values of the variation of the value of the current are equal, and with δ denoting the duty cycle of the pulse width modulation signal applied by control means (not represented) to the switch 8, it is possible to deduce from this that the voltage Vs is connected at each instant with the voltages V1 and V2 by the following equation:

$$Vs = V1 + \delta \times V2$$

The control means can be included in an electronic control unit (ECU) of the vehicle or in any other device capable of producing pulse width modulation signals.

Furthermore, with L denoting the value of the inductance 10 and T denoting the period of the pulse width modulation signal, one obtains an expression of the variation of the current denoted by ΔI:

$$\Delta I = \frac{V2 \times T}{L}(1-\delta)\delta$$

The maximum value of the variation of the current ($\Delta I_{max}$) is therefore obtained for a duty cycle of 50%:

$$\Delta I_{max} = \frac{V2 \times T}{4L}$$

The parameters of the circuit than can be modified include the frequency or the period of the pulse width modulation signal applied to the switch 8, the variation of the duty cycle, and the parasitic elements (the inductance 10).

In order to protect the components, it is preferable to reduce the value of $\Delta I_{max}$. It is therefore possible, for example, to increase the value L of the inductance 10 by lengthening the electrical connection or by using ferrite.

It is also possible to increase the frequency of the pulse width modulation signal. That being said, the losses in the switch (which can be a MOSFET transistor) limit this frequency increase. These losses can be due to the conduction through the switch which depends on its internal resistance or to the losses by switching of this switch.

In a conventional manner, it is possible to calculate the losses during conduction, during closing and during opening of the switch. By taking into consideration the maximum temperature of the switch (or of the junction in the case of a MOSFET transistor), it is possible to obtain the maximum switching frequency $f_{max}$:

$$f_{max} = \frac{E_{switching\ max}}{(E_{ON} + E_{OFF}) \times T_{charging}}$$

Where:
$E_{switching\ max}$ the maximum switching energy,
$E_{ON}$ the energy with opening of the switch,
$E_{OFF}$ the energy with closing of the switch, and
$T_{charging}$ the total charging time which depends on the variation of the duty cycle.

Figure 4:
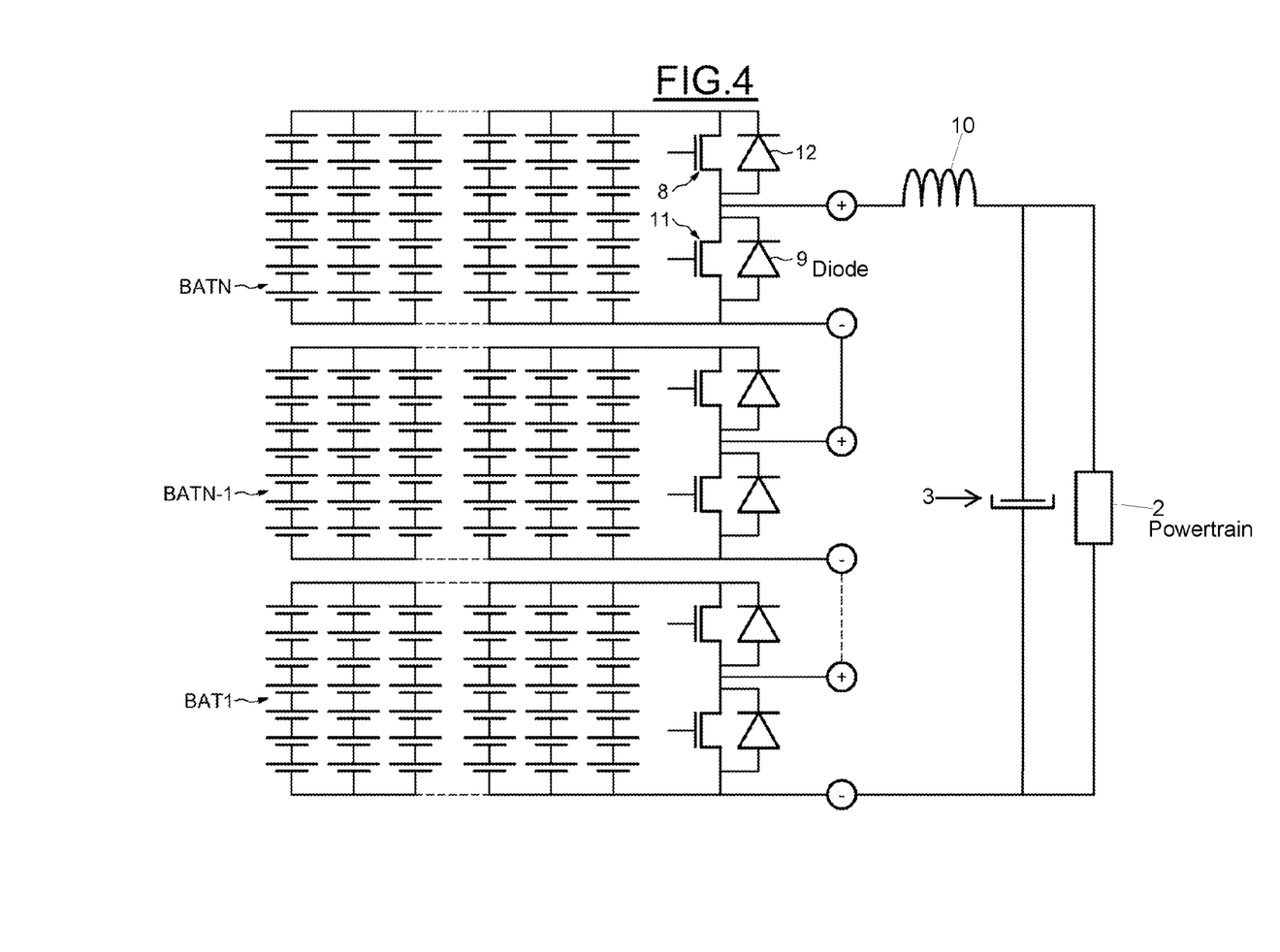

Represented in FIG. 4 is a variant of the invention in which the switch 8 is a MOSFET transistor and the diode 9 is an intrinsic diode of a MOSFET transistor 11. The transistor 8 is also provided with an intrinsic diode 12.

All the battery modules BAT 1 to BATN can be provided with two MOSFET transistors.

It can be noted that, by applying additional control signals to the transistors 8 and 11, the flow of a current in the negative direction, which is normally blocked by the diode 9, is allowed. Therefore, no discontinuity of the current can appear.

In another variant not represented, it is possible to connect an additional capacitor in parallel on the branch supporting the two MOSFET transistors.

Figure 5:
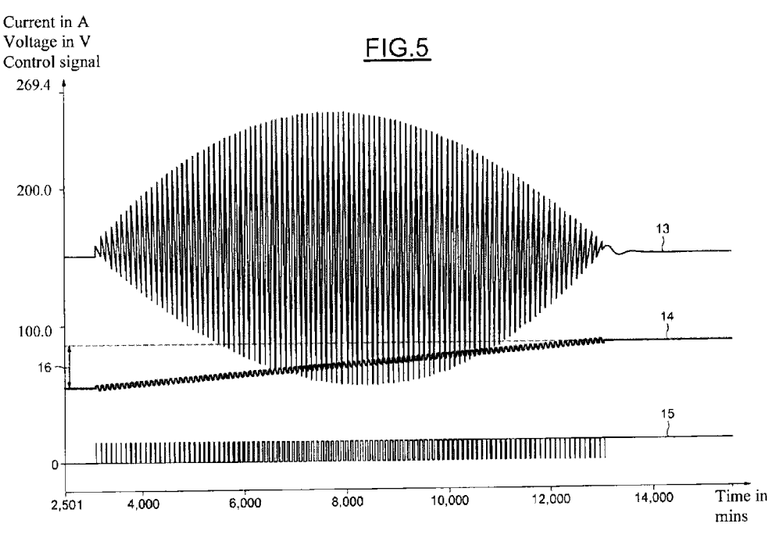
FIG. 5 illustrates the change of the voltage at the terminals of the capacitor and the change of the current through the inductance connecting the battery to the capacitor in the case of connection of a battery module.

In FIG. 5, represented on curve 13 is the change of the current passing through the inductance 10 as a function of time, represented on curve 14 is the change of the voltage at the terminals of the capacitor 3 as a function of time, and represented on curve 15 is the change of the control signal applied to the switch 15 as a function of time, for example, in the case of connection of an additional battery module.

It can be noted that the voltage increase corresponding to the connection of an additional module (arrow 16) is on the order of 30 volts. Furthermore, as illustrated by curves 13, 14 and 15, when the duty cycle increases, there is an almost linear increase of the voltage at the terminals of the capacitor, and an oscillation of the current. The maximum variation of the current is obtained for a duty cycle in the vicinity of 50%, as indicated above. Furthermore, the current circulating through the inductance 10 is not cancelled out here; one is therefore in a continuous conduction mode.

Thanks to the invention, one obtains a pre-charging of a capacitor with reduced losses and whose duration can be controlled by changing, for example, the frequency or the duty cycle of the pulse width modulation signal.

By going from a duty cycle having a value of 0% to a value of 100% sufficiently slowly (or the reverse) with respect to the response time of the powertrain, it is possible to allow the powertrain to take control of the motor without risking damage.

The invention is also compatible with any type of switch and diodes, for example, IGBT type components well known to the person skilled in the art, or also components on a gallium nitride (GaN) substrate.

The invention can moreover be used for any type of battery.

The invention claimed is:
1. A system for progressively increasing voltage at terminals of an input capacitor, comprising:
  a battery including a plurality of battery modules arranged in series, each said battery module including a switch, a diode, and a plurality of battery cells, the switch and the diode being arranged in series and connected in parallel to the plurality of battery cells, wherein each said battery module includes:
- a positive terminal connected between the switch and a cathode of the diode, and
- a negative terminal connected to the plurality of battery cells and to an anode of the diode, wherein the battery modules are connected in series so that the positive terminal of a last battery module of the plurality of battery modules is connected to a positive terminal of the battery, the negative terminal of the first battery module of the plurality of battery modules is connected to a negative terminal of the battery, and the modules are connected so that the positive terminal of each battery module of the plurality of battery modules is connected to the negative terminal of a next battery module of the plurality of battery modules;

the input capacitor connected directly by an electrical connection to the positive and negative terminals of the battery;

a load connected in parallel to the input capacitor;

means for controlling the switch of each of the battery modules using a pulse width modulation signal having a duty cycle that varies between 0% and 100%; and logic means for commanding the means for controlling the switch of each said battery module sequentially so that the switch of each said battery module is progressively closed one after the other.

2. A system according to claim 1, wherein the means for controlling the switch of each of the battery modules varies the duty cycle of the pulse width modulation signal by a same percentage in each pulse.

3. A system according to claim 1, wherein the means for controlling the switch of each of the battery modules varies a frequency of the pulse width modulation signal.

4. A system according to claim 1, further comprising, for each said battery module, an additional capacitor connected in parallel to the diode and to the switch of the battery module.

5. A system according to claim 1, wherein, for each said battery module, the switch is a MOSFET transistor, and the diode is an intrinsic diode of a MOSFET transistor.

6. A system according to claim 5, further comprising additional means for controlling the MOSFET transistor corresponding to the diode of each said battery module using an inverse signal of that controlling each said switch.

7. A system according to claim 1, further comprising means for adjusting inductance of the electrical connection.

8. A system according to claim 1, wherein the means for controlling the switch of each of the battery modules uses as the pulse with modulation signal a pulse width modulation signal having a duty cycle varying between 0% and 100%, 0% and 100% being excluded.

9. An electric or hybrid powertrain automobile comprising the system according to claim 1, the load being a powertrain of the automobile.

10. A system according to claim 1, wherein the logic means commands the means for controlling the switch of each of the battery modules so that:
the means for controlling the switch of each of the battery modules initially commands the switch of each said battery module open, then
the means for controlling the switch of each of the battery modules commands the switch of a first battery module of the plurality of battery modules so that the duty cycle is progressively increased from 0% to 100% while the switches of the other battery modules of the plurality are kept opened, and
the means for controlling the switch of each of the battery modules commands the switch of each said battery module so that the duty cycle is progressively increased from 0% to 100% once the switch of the previous battery module has reached a duty cycle of 100% and until the switches of every battery module have reached the duty cycle of 100%.

11. A method for progressively increasing voltage at terminals of an input capacitor, of a system, the system including:
a battery including a plurality of battery modules arranged in series,
wherein each of the battery modules includes a switch, a diode, and a plurality of battery cells, the switch and the diode being arranged in series and connected to the plurality of battery cells,
wherein each said battery module includes:
a positive terminal connected between the switch and a cathode of the diode, and
a negative terminal connected to the plurality of battery cells and to an anode of the diode,
wherein the battery modules are connected in series so that the positive terminal of a last battery module of the plurality of battery modules is connected to a positive terminal of the battery, the negative terminal of the first battery module of the plurality of battery modules is connected to a negative terminal of the battery, and the modules are connected so that the positive terminal of each battery module of the plurality of battery modules is connected to the negative terminal of a next battery module of the plurality of battery modules;
the input capacitor connected directly by an electrical connection to the positive and negative terminals of the battery; and
a load connected in parallel to the input capacitor,
the method comprising:
elaborating a pulse width modulation signal having a duty cycle varying between 0% and 100% to control the switch of each of the battery modules; and
closing progressively the switch of each said battery module one after the other.

12. A method according to claim 11, wherein the duty cycle of the pulse width modulation signal is varied by a same percentage in each pulse.

13. A method according to claim 11, wherein a frequency of the pulse width modulation signal is varied.

14. A method according to claim 11, further comprising adjusting inductance of the electrical connection connecting the input capacitor and the battery.

15. A method according to claim 11, wherein the duty cycle is varied between 0% and 100%, 0% and 100% being excluded.

16. A method according to claim 11, wherein the switch of each said battery module is initially opened, then the switch of a first module of the plurality of battery modules is controlled so that the duty cycle is progressively increased from 0% to 100% while the switches of the other battery modules of the plurality are kept opened, the switches of the plurality of battery modules are controlled so that the duty cycle is progressively increased from 0% to 100% once the switch of a previous battery module of the plurality of battery modules has reached a duty cycle of 100% and until the switch of every battery module of the plurality of battery modules has reached a duty cycle of 100%.

\* \* \* \* \*